United States Patent
Hayashi

(10) Patent No.: US 9,334,962 B2
(45) Date of Patent: May 10, 2016

(54) GASKET FOR SMALL SIZE ELECTRONIC APPLIANCE

(75) Inventor: Takahiro Hayashi, Fujisawa (JP)

(73) Assignee: Nippon Mektron, Ltd. (JP)

( * ) Notice: Subject to any disclaimer, the term of this patent is extended or adjusted under 35 U.S.C. 154(b) by 1184 days.

(21) Appl. No.: 13/322,833

(22) PCT Filed: May 11, 2010

(86) PCT No.: PCT/JP2010/057925
§ 371 (c)(1),
(2), (4) Date: Nov. 28, 2011

(87) PCT Pub. No.: WO2010/143488
PCT Pub. Date: Dec. 16, 2010

(65) Prior Publication Data
US 2012/0074653 A1    Mar. 29, 2012

(30) Foreign Application Priority Data

Jun. 12, 2009 (JP) ................. 2009-140823

(51) Int. Cl.
*F16J 15/46* (2006.01)
*F16J 15/10* (2006.01)

(52) U.S. Cl.
CPC ................... *F16J 15/106* (2013.01)

(58) Field of Classification Search
CPC ....... F16J 15/10; F16J 15/0887; F16J 15/061; F16J 15/062
USPC ................................ 277/644, 641
See application file for complete search history.

(56) References Cited

U.S. PATENT DOCUMENTS

| | | | |
|---|---|---|---|
| 5,002,290 A * | 3/1991 | Pernin .................... | 277/649 |
| 6,264,206 B1 * | 7/2001 | Hashizawa et al. ......... | 277/641 |
| 6,523,833 B1 * | 2/2003 | Ishigaki et al. ............ | 277/650 |
| 6,722,660 B2 * | 4/2004 | Gernand et al. .......... | 277/591 |
| 2005/0225039 A1 * | 10/2005 | Seki et al. ............. | 277/637 |
| 2006/0049585 A1 * | 3/2006 | Isono ................... | 277/637 |
| 2013/0207352 A1 * | 8/2013 | Furubayashi et al. ....... | 277/641 |

FOREIGN PATENT DOCUMENTS

| JP | 61-165071 A | 7/1986 |
|---|---|---|
| JP | 2008-249139 A | 10/2008 |

* cited by examiner

*Primary Examiner* — Kristina Fulton
*Assistant Examiner* — Nathan Cumar
(74) *Attorney, Agent, or Firm* — Harness, Dickey & Pierce, P.L.C.

(57) ABSTRACT

A waterproof gasket for a small size electronic appliance of the invention has straight portions (1A) and corner portions (1B) alternately in a peripheral direction, a main seal portion (11) and a seat seal portion (12) brought into close contact with a bottom surface of a gasket retention groove are formed, a shoulder portion (13) protruding in a width direction between said main seal portion (11) and the seat seal portion (12) so as to be brought into close contact with an inner side surface of a groove shoulder of said gasket retention groove is formed in said straight portion (1A), and a recession portion (14) retracting in a width direction relatively from said shoulder portion (13) between said main seal portion (11) and the seat seal portion (12) is formed in said corner portion (1B). Accordingly, a partial compression reaction force increase is prevented in the corner portion.

1 Claim, 4 Drawing Sheets

GASKET FOR SMALL SIZE ELECTRONIC APPLIANCE

CROSS-REFERENCE TO RELATED APPLICATIONS

This application is a U.S. National Stage Application of International Application No. PCT/JP2010/057925, filed May 11, 2010 and published in the Japanese language as WO/2010/143488 on Dec. 16, 2010. This application claims the benefit of Japanese Application No. 2009-140823, filed Jun. 12, 2009. The entire disclosures of the above applications are incorporated herein by reference.

BACKGROUND OF THE INVENTION

1. Field of the Invention

The present invention relates to a waterproof gasket which is installed to an outer shell case of a small size electronic appliance such as a mobile device, a digital camera or the like.

2. Description of the Conventional Art

An outer shell case of a mobile device such as a cellular phone or the like is structured such that a waterproof gasket 100 as shown in FIG. 6 is interposed between mating faces in a division portion, whereby a waterproofing is achieved. This kind of waterproof gasket 100 is made of a rubber-like elastic material (a rubber material or a synthetic resin material having a rubber-like elasticity), and is formed as an endless shape which has straight portions 101a and corner portions 101b alternately in a peripheral direction, for example, extends in a rounded rectangular shape, in correspondence to a shape of the mating face in a division portion of the outer shell case.

Further, this kind of waterproof gasket 100 has a chevron main seal portion 101 and a plurality of seat seal portions 102 in an opposite side thereto, as shown in FIG. 7, is retained within a gasket retention groove 201a which is formed in one case member (for example, a case main body) 201 constructing the outer shell case along its outer periphery, and is structured such that the main seal portion 101 is brought into close contact with another case member (for example, a front panel) 202 and the seat seal portion 102 is seated in a close contact state on a bottom surface of the gasket retention groove 201a, in an assembled state of the outer shell case, thereby achieving a sealing function with respect to a dust, a water or the like in an outer portion.

Further, since a sealing performance is damaged and a water intrusion from an outer portion is generated even under a slight water pressure if the waterproof gasket 100 collapses within the gasket retention groove 201a in an assembling process of the outer shell case (the case member 201 and the case member 202) or the like, there has been conventionally known that the waterproof gasket 100 has a shoulder portion 103 for preventing the collapsing that is circumferentially continuously formed in a protruding manner in both side surface portions between the main seal portion 101 and the seat seal portion 102 as shown in the Japanese Unexamined Patent Publication No. 2008-249139.

SUMMARY OF THE INVENTION

However, in accordance with the conventional waterproof gasket 100 mentioned above, there has been pointed out such a problem that a reaction force with respect to a compression becomes larger in the corner portions 101b which exist at a plurality of positions in a peripheral direction shown in FIG. 6. Further, since a downsizing of the mobile device has made progress more and more in recent years, the outer shell case is under such a condition that a strength reduction caused by a thinning is unavoidable, and there is such a problem that in the case that a compression reaction force of the waterproof gasket 100 is partly large in the corner portion 101b, a deformation tends to be generated in the outer shell case (the case member 201 and the case member 202) on the basis of it.

The present invention is made by taking the point mentioned above into consideration, and a technical object of the present invention is to prevent a partial increase of a compression reaction force in a corner portion as well as making it hard for a collapsing of a waterproof gasket to be generated within a gasket retention groove, in a waterproof gasket which is installed to an outer shell case of a small size electronic appliance.

Means for Solving the Problem

As a means for effectively solving the technical object mentioned above, a waterproof gasket for a small size electronic appliance in accordance with the present invention is structured such as to be retained to a gasket retention groove which is peripherally provided in one of first and second case members constructing an outer shell case of the small size electronic appliance, in which straight portions and corner portions corresponding to outer peripheral shapes of the first and second case members are provided alternately in a peripheral direction, a main seal portion brought into close contact with another of the first and second case members and a seat seal portion brought into close contact with a bottom surface of the gasket retention groove are formed, a shoulder portion protruding out in a width direction between the main seal portion and the seat seal portion so as to be brought into close contact with an inner side surface of a groove shoulder of the gasket retention groove is formed in the straight portion, and a recession portion retracting in a width direction relatively from the shoulder portion between the main seal portion and the seat seal portion is formed in the corner portion.

In accordance with the structure mentioned above, even if an external force in a collapsing direction is applied to the waterproof gasket which is accommodated in the gasket retention groove in an assembling process of the outer shell case of the small size electronic appliance or the like, the shoulder portion formed so as to protrude between the main seal portion and the seat seal portion in the straight portion comes into contact with the inner side surface of the groove shoulder of the gasket retention groove, whereby the waterproof gasket is supported, and is hard to collapse since the corner portion of the waterproof gasket is curved largely. Therefore, the collapsing of the waterproof gasket is suppressed within the gasket retention groove, and a desired seal surface pressure of the main seal portion can be secured.

Further, the reaction force at a time of being exposed to the compression becomes larger in the corner portion than in the straight portion generally, in this kind of gasket, however, in accordance with the structure mentioned above, since the recession portion retracting in the width direction relatively with respect to the shoulder portion in the straight portion is formed between the main seal portion and the seat seal portion in the corner portion, a filling factor within the gasket retention groove becomes lower, and the reaction force with respect to the compression is suppressed.

Effect of the Invention

In accordance with the waterproof gasket for the small size electronic appliance on the basis of the present invention, the collapsing of the waterproof gasket is hard to be generated within the gasket retention groove, by the shoulder portion which is provided in the straight portion, and it is possible to prevent the compression reaction force from being increased in the corner portion.

DETAILED DESCRIPTION OF PREFERRED EMBODIMENT

Figure 1:
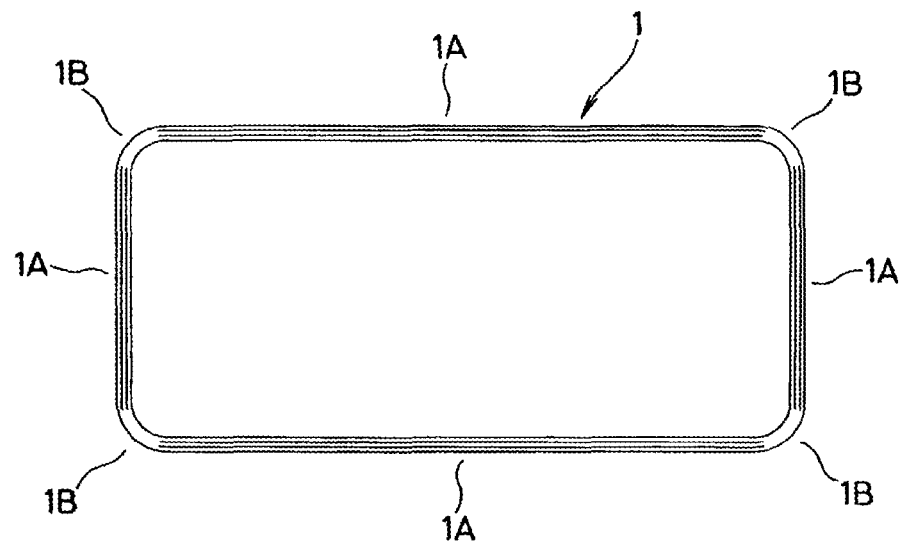
FIG. 1 is a plan view as seen from a compressing direction of a waterproof gasket for a small size electronic appliance in accordance with the present invention.

A description will be given below of a preferable embodiment for executing a waterproof gasket for a small size electronic appliance in accordance with the present invention with reference to the accompanying drawings. A waterproof gasket 1 shown in FIG. 1 and FIG. 2 is structured such as to achieve a waterproofing function and a function of preventing an intrusion of an outer dust, by being interposed in an appropriately compressed state between a first case member 2 and a second case member 3 shown in FIG. 3 and FIG. 4.

Describing in detail, the first case member 2 and the second case member 3 are assembled in a state in which outer peripheral portions are brought into contact and aligned with each other, thereby constructing an outer shell case of a lower unit and an upper unit of a cellular phone or the like. A gasket retention groove 21 extending like a rounded rectangular shape is formed along an outer periphery in an opposed surface to the second case member 3 in the first case member 2. Therefore, a waterproof gasket 1 retained by the gasket retention groove 21 is structured such as to extend like a rounded rectangular endless shape while having straight portions 1A and curved corner portions 1B alternately in a peripheral direction as shown in FIG. 1 in correspondence thereto.

Figure 3:
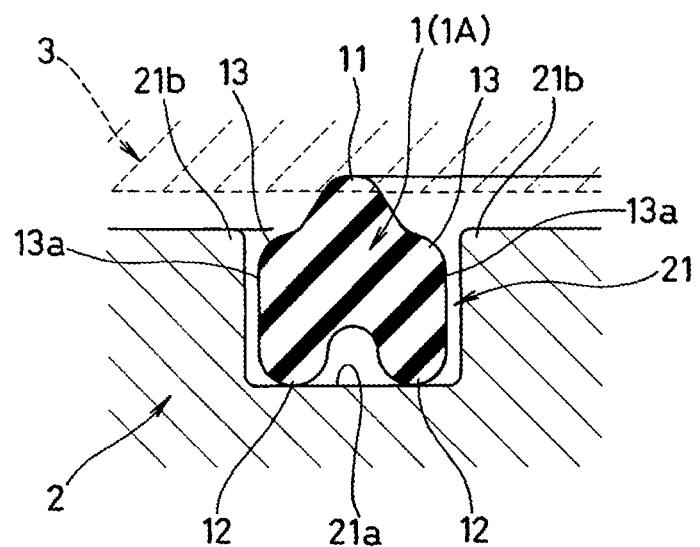
FIG. 3 is a partly cross sectional view of an installed state and shows the waterproof gasket for the small size electronic appliance in accordance with the present invention by cutting along the straight portion.
Figure 4:
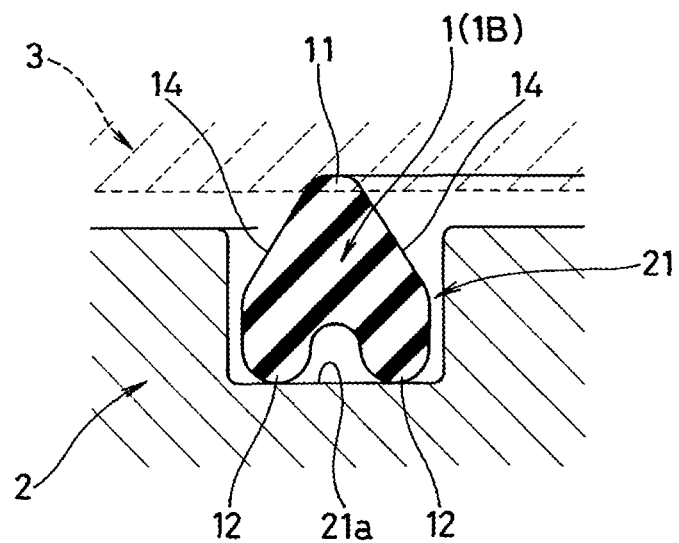
FIG. 4 is a partly cross sectional view of an installed state and shows the waterproof gasket for the small size electronic appliance in accordance with the present invention by cutting along the corner portion.

The waterproof gasket 1 is made of a rubber-like elastic material (a rubber material or a synthetic resin material having a rubber-like elasticity), which is formed with a width which can be loosely fitted to the gasket retention groove 21. Further, as shown in FIGS. 3 and 4, the waterproof gasket 1 has a main seal portion 11 with a chevron cross sectional shape which protrudes to an outer side of the gasket retention groove 21 so as to be brought into close contact with the second case member 3, and a pair of inner and outer peripheral seat seal portions 12 formed as a circular arc cross sectional shape in parallel to each other. The seat seal portions 12 are formed facing to the opposite side of the main seal portion 11 and seated on a bottom surface 21a of the gasket retention groove 21.

Figure 2:
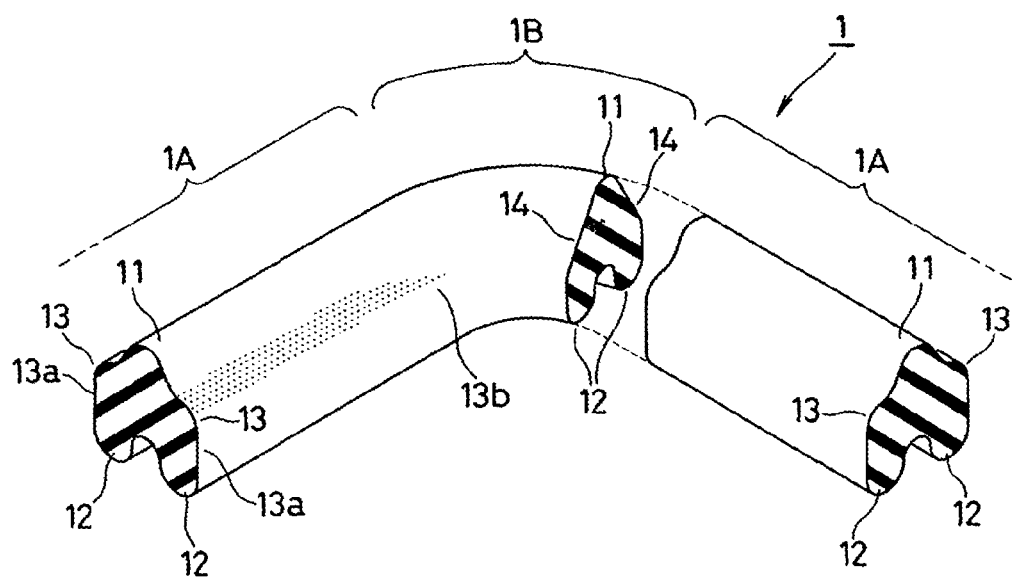
FIG. 2 is a cross sectional perspective view plan view showing a cross sectional shape at a plurality of positions in a peripheral direction in the waterproof gasket for the small size electronic appliance in accordance with the present invention.

A pair of inner and outer peripheral shoulder portions 13 are formed in each of the straight portions 1A in the waterproof gasket 1, the shoulder portions 13 protruding to both sides in a width direction between the main seal portion 11 and the seat seal portion 12, as shown in FIG. 2. The shoulder portion 13 is formed at a height which is approximate to a groove shoulder 21b in the gasket retention groove 21, as shown in FIG. 3, and an outer side surface 13a thereof is approximately on the same plane as an outer side surface of the seat seal portion 12. Therefore, in a state in which the waterproof gasket 1 is retained by the gasket retention groove 21, the shoulder portion 13 is structured such as to be close to an inner side surface of the groove shoulder 21b with a slight gap.

On the other hand, in each of the corner portions 1B in the waterproof gasket 1, as shown in FIG. 2 and FIG. 4, there are formed a pair of inner and outer peripheral recession portions 14 which retract relatively with respect to a width direction from the shoulder portion 13 mentioned above between the main seal portion 11 and the seat seal portion 12. Further, the recession portions 14 are formed as extending surfaces from slant faces in both sides in the width direction of the main seal portion 11, and a boundary between the shoulder portion 13 in the straight portion 1A and the recession portion 14 is formed smooth. In other words, an end portion 13b of the shoulder portion 13 is lower little by little its protruding height toward the corner portion 1B side. Accordingly, as shown in FIG. 2, a cross sectional shape of the waterproof gasket 1 is continuously changed between the straight portion 1A and the corner portion 1B.

In this case, it is preferable that a cross sectional area of the waterproof gasket 1 is set such a magnitude that a filling factor of the waterproof gasket 1 with respect to the gasket retention groove 21 does not go beyond 100% at a time of being compressed between the bottom surface 21a of the gasket retention groove 21 in the first case member 2 and the second case member 3, and both the side surfaces come close to both inner side surfaces of the gasket retention groove 21 as much as possible. This is because if the filling factor of the waterproof gasket 1 within the gasket retention groove 21 reaches 100% on the basis of the compression, a compression reaction force becomes significantly large at that time.

In accordance with the waterproof gasket 1 for the small size electronic appliance provided with the structure mentioned above, in the case that an external force in a direction of bringing down the straight portion 1A is applied to the waterproof gasket 1 within the gasket retention groove 21, in an assembling process of the outer shell case of the cellular phone or the like, the straight portion 1A is supported by one of the shoulder portions 13 and 13 formed in the inner and outer peripheries coming into contact with the inner side surface of one groove shoulder 21b in the gasket retention groove 21. Accordingly, a collapsing of the straight portion 1A is suppressed, and a desired seal surface pressure of the main seal portion 11 is secured.

Further, in the case that an external force in a direction of bringing down the corner portion 1B is applied to the waterproof gasket 1 within the gasket retention groove 21, the corner portion 1B is curved at 90 degree while being curved as a circular arc shape and is hard to collapse by nature. Therefore, the collapsing of the corner portion 1B is held down.

Accordingly, it is possible to suppress a reduction of a seal surface pressure of the main seal portion 11 caused by the collapsing of the waterproof gasket 1, and it is possible to secure a desired waterproofing performance. Further, since a width of the waterproof gasket 1 is slightly smaller than a width of the gasket retention groove 21, that is, the waterproof gasket 1 is loosely fitted to the gasket retention groove 21, an easiness of an installation is secured.

Further, in this kind of waterproof gasket 1, it has been known that in the case that a cross section has the same shape and the same magnitude all around a periphery, a reaction force at a time of being exposed to a compression becomes larger in the corner portion 1B than in the straight portion 1A. However, in accordance with the structure mentioned above, since the portion between the main seal portion 11 and the seat seal portion 12 in the corner portion 1B is formed as the recession portion 14 which retracts in the width direction relatively in comparison with the shoulder portion 13 in the straight portion 1A, a volume becomes smaller at that degree. In other words, the filling factor within the gasket retention groove 21 becomes low, and the compression reaction force is suppressed.

Accordingly, it is possible to prevent a deformation from being generated in the outer shell case (the first case member 2 and the second case member 3) due to a partial enlargement of the compression reaction force of the waterproof gasket 1 in the corner portion 1B.

Figure 5:
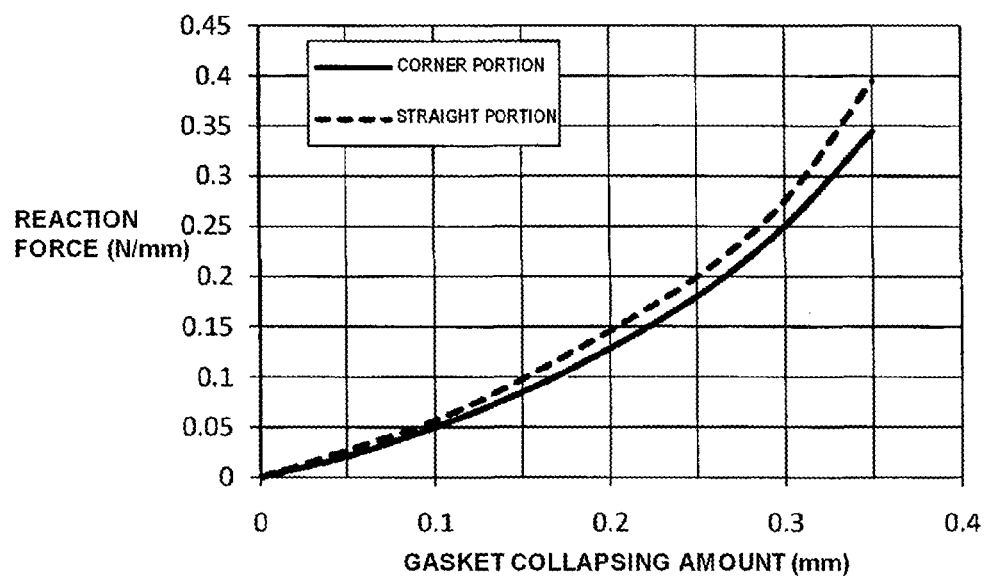
FIG. 5 is a graph showing a result obtained by applying an FEM analysis to a reaction force at a time of compressing the straight portion having the cross sectional shape in FIG. 3 and the corner portion having the cross sectional shape in FIG. 4.
Figure 6:
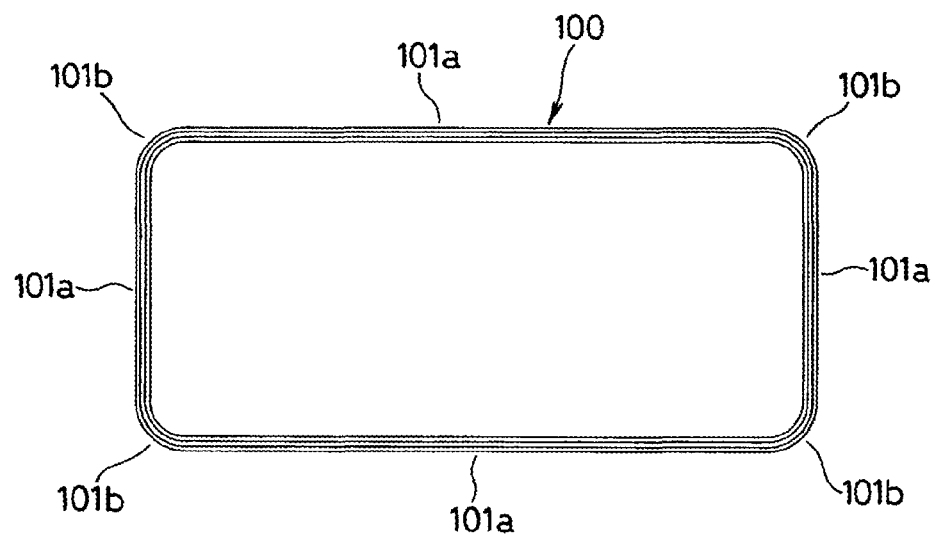
FIG. 6 is a plan view as seen from a compressing direction of a conventional waterproof gasket for a small size electronic appliance.
Figure 7:
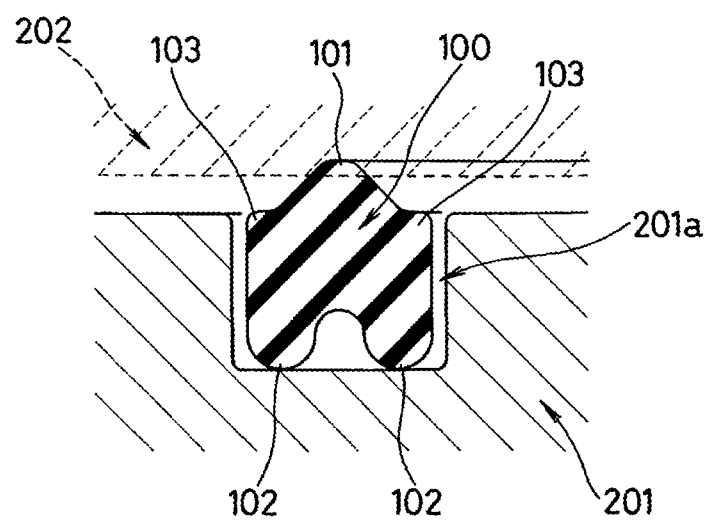
FIG. 7 is a partly cross sectional view of an installed state and shows the conventional waterproof gasket for the small size electronic appliance.

In this case, FIG. 5 shows a result obtained by applying an FEM analysis to the reaction force at a time of compressing the straight portion having the cross sectional shape in FIG. 3 and the corner portion having the cross sectional shape in FIG. 4. On the basis of the result, it is confirmed that the compression reaction force of the corner portion can be effectively suppressed by the present invention.

What is claimed is:

1. A waterproof gasket assembly having a retention groove provided in one of first and second case members and a waterproof gasket to be retained in said retention groove, said waterproof gasket comprising:
    straight portions and corner portions provided alternately in a peripheral direction corresponding to outer peripheral shapes of said first and second case members;
    a main seal portion formed to be brought into close contact with another of said first and second case members; and
    a seat seal portion formed to be brought into close contact with a bottom surface of said gasket retention groove;
    wherein said straight portion has a shoulder portion protruding out in a width direction between said main seal portion and the seat seal portion to be brought into close contact with an inner side surface of a groove shoulder of said gasket retention groove,
    wherein said corner portion has a recession portion retracting in a width direction relatively from said shoulder portion between said main seal portion and the seat seal portion, and
    wherein, a first gap distance between said shoulder portion and said inner side surface of said groove shoulder is smaller than a second gap distance between said recession portion and said inner side surface of said groove shoulder.

* * * * *